(12) United States Patent
Chen et al.

(10) Patent No.: US 10,397,517 B2
(45) Date of Patent: Aug. 27, 2019

(54) MATRIX SWITCHER

(71) Applicant: LONTIUM SEMICONDUCTOR CORPORATION, Hefei Anhui (CN)

(72) Inventors: Feng Chen, Hefei Anhui (CN); Dafeng Zhou, Hefei Anhui (CN); Yong Shen, Hefei Anhui (CN); Hongfeng Xia, Hefei Anhui (CN); Shenghui Bao, Hefei Anhui (CN); Ligang Hu, Shenzhen Guangdong (CN); Rongliang Yu, Shenzhen Guangdong (CN); Shiyong Liang, Shenzhen Guangdong (CN)

(73) Assignee: LONTIUM SEMICONDUCTOR CORPORATION, Hefei Anhui (CN)

( * ) Notice: Subject to any disclaimer, the term of this patent is extended or adjusted under 35 U.S.C. 154(b) by 0 days.

(21) Appl. No.: 16/007,321

(22) Filed: Jun. 13, 2018

(65) Prior Publication Data

US 2018/0367754 A1    Dec. 20, 2018

(30) Foreign Application Priority Data

Jun. 16, 2017  (CN) .......................... 2017 1 0457709
Jun. 16, 2017  (CN) .................... 2017 2 0707004 U
Jul. 24, 2017  (TW) .............................. 106124702 A

(51) Int. Cl.
*H04N 7/10*   (2006.01)
*H04N 7/015*  (2006.01)
*H04N 21/4363*  (2011.01)

(52) U.S. Cl.
CPC ............ *H04N 7/104* (2013.01); *H04N 7/015* (2013.01); *H04N 7/106* (2013.01); *H04N 21/43635* (2013.01)

(58) Field of Classification Search
CPC ......... H04N 7/104; H04N 7/015; H04N 7/106
See application file for complete search history.

(56) References Cited

U.S. PATENT DOCUMENTS

| 5,130,793 | A  | * | 7/1992  | Bordry .................... H04N 7/10 348/E7.049 |
| 2016/0345055 | A1 | * | 11/2016 | Kim ................ H04N 21/43635 |
| 2017/0070700 | A1 | * | 3/2017  | Sizemore ............... H04N 5/268 |
| 2018/0199047 | A1 | * | 7/2018  | Hook ..................... H04N 19/30 |
| 2018/0220144 | A1 | * | 8/2018  | Su .......................... H04N 19/70 |

OTHER PUBLICATIONS http://www.lontiumsemi.com/?thread-2420-1.html Lontium Semiconductor LT8644 product page. (Year: 2016).*

* cited by examiner

*Primary Examiner* — Michael E Teitelbaum
(74) *Attorney, Agent, or Firm* — Cantor Colburn LLP

(57) ABSTRACT

A matrix switcher is provided. A code rate of an ultra-high-definition video signal is reduced on the premise that the quality of the ultra-high-definition video signal is not affected through performing a Color Space Conversion (CSC) process and/or a Digital Stream Compression (DSC) process on the ultra-high-definition video signal at the transmitting side chip, thereby reducing a bandwidth required in conversion, switch and transmission of the ultra-high-definition video signal. A matrix switch chip with a low cost and general performance is used. Then, a corresponding DSC data decompression process and/or CSC process are performed at the receiving side to recover the performance of the ultra-high-definition video signal.

7 Claims, 4 Drawing Sheets

MATRIX SWITCHER

CROSS REFERENCE TO RELATED APPLICATION(S)

The present application claims priority under 35 U.S.C. § 119 to Chinese Patent Application No. 201710457709.8, filed on Jun. 16, 2017, Chinese Patent Application No. 201720707004.2, filed on Jun. 16, 2017 and Taiwan Patent Application No. 106124702, filed on Jul. 24, 2017, the entire contents of which are incorporated herein by reference.

FIELD

The present disclosure relates to the technical field of signal processing, and in particular to a matrix switcher.

BACKGROUND

High Definition Multimedia Interface (HDMI) and Display Port (DP) can transmit ultra-high-definition signals such as 4K signals and 8K signals. Such ultra-high-definition signals have a property of high resolution without compression and lossless and a property of real-time, which can provide users with high-quality listening and visual experience.

The ultra-high-definition signal may be transmitted through a switchers or a distributor during a transmission process to meet demands of different users, and a chip of the switcher or the distributor includes multiple MOS switches connected in parallel and in series. This structure results in a linear increase in a parasitic capacitance and resistance of the switcher or the distributor, which leads to a rapid attenuation of the ultra-high-definition signal. The ultra-high-definition signal cannot be guaranteed to have the property of high resolution without compression and lossless and the property of real-time, which greatly reduces user experience.

At present, a chip of the switcher or the distributor is manufactured with an advanced chip manufacturing process, and a clock data recovery (CDR) circuit is designed in the chip of the switcher or the distributor at each level to remove an impact of bandwidth shortage and noises on signal quality. The function of switching or distributing the ultra-high-definition signal is achieved through multi-level cascading, and the chip of such switcher or distributor has a high cost and large power consumption. In order to save the cost, generally, the ultra-high-definition signal adopting the HDMI or DP protocol is unpacked and then compressed (such as JPEG H.264, etc.) and then converted into a network protocol. The signal is switched and distributed via a network switch or a Field Programmable Gate Array (FPGA) chip. The switched or distributed signal is decompressed and converted into the signal adopting the HDMI or DP protocol. However, with this method, the quality of the ultra-high-definition signal may be destroyed. Especially for moving pictures, the video may even be stopped. Furthermore, compression and decompression processes take a relatively long time, for application scenarios with high requirements of real-time, such as synchronous broadcast, seamless switching, games, this method cannot be used.

Therefore, how to achieve the function of switching or distributing the ultra-high-definition signal with a low-cost switcher or distributor on a premise of ensuring the quality of the ultra-high-definition signal has become a technical problem urgently to be solved by those skilled in the art.

SUMMARY

In view of this, a matrix switcher is provided according to the embodiment of the present disclosure, so as to achieve a function of switching or distributing an ultra-high-definition signal with a low-cost switcher or distributor on a premise of ensuring the quality of the ultra-high-definition signal.

In order to achieve the above purpose, following technical solutions are provided according to the embodiments of the present disclosure.

A matrix switcher is provided, which includes M transmitting side chips, K matrix switch chips and N receiving side chips. The M transmitting side chips are connected to the N receiving side chips via the K matrix switch chips. The K matrix switch chips are configured to forward at least one group of input signals transmitted from the M transmitting side chips to the N receiving side chips. Each of M, K and N is an integer greater than or equal to 1, and the value of each of M and N is greater than the value of K. Each of the transmitting side chips includes: a signal receiving circuit, configured to receive an ultra-high-definition video signal and unpack the ultra-high-definition video signal; a logic processor, configured to perform at least one of a Color Space Conversion (CSC) process and a Digital Stream Compression (DSC) process on the unpacked ultra-high-definition video signal to generate a compressed video signal; and a signal transmitting circuit, configured to transmit the compressed video signal to the K matrix switch chips through four universal high-speed differential serial ports SERializer/DESerializer (SERDESs). Each of the receiving side chips includes: a signal receiving circuit, configured to receive the compressed video signal outputted from the K matrix switch chips through the four SERDESs; a logic processor, configured to perform at least one of a DSC data decompression process and a CSC process on the compressed video signal to generate a decompressed video signal; and a signal transmitting circuit, configured to recover the decompressed video signal to generate an ultra-high-definition video signal and transmit the recovered ultra-high-definition video signal to an external device.

In an embodiment, the ultra-high-definition video signal includes an ultra-high-definition video signal adopting a High Definition Multimedia Interface (HDMI) protocol or a Display Port (DP) protocol.

In an embodiment, in a case where the ultra-high-definition video signal is the ultra-high-definition video signal adopting the DP protocol, the four SERDESs of the signal transmitting circuit of the transmitting side chip are configured to transmit four channels of data signals; and in a case where the ultra-high-definition video signal is the ultra-high-definition video signal adopting the HDMI protocol, the four SERDESs of the signal transmitting circuit of the transmitting side chip are configured to transmit three channels of data signals and one channel of a clock signal.

In an embodiment, the signal transmitting circuit of the transmitting side chip further includes a bidirectional auxiliary control channel configured to transmit a control signal and auxiliary information.

In an embodiment, the transmitting side chip is an Application Specific Integrated Circuit (ASIC) chip or a Field Programmable Gate Array (FPGA) chip.

In an embodiment, the matrix switch chip is a LT8644 type matrix switch chip.

In an embodiment, in a case where the four SERDESs of the signal transmitting circuit of the transmitting side chip are configured to transmit four channels of data signals, the four SERDESs of the signal receiving circuit of the receiving side chip are configured to receive four channels of data signals; and in a case where the four SERDESs of the signal transmitting circuit of the transmitting side chip are configured to transmit three channels of data signals and one channel of a clock signal, the four SERDESs of the signal receiving circuit of the receiving side chip are configured to receive three channels of data signals and one channel of a clock signal.

In an embodiment, the receiving side chip is an Application Specific Integrated Circuit (ASIC) chip or a Field Programmable Gate Array (FPGA) chip.

In an embodiment, the value of M is 8, the value of K is 2, and the value of N is 8.

Based on the above technical solutions, a matrix switcher is provided according to the embodiment of the present disclosure. A code rate of an ultra-high-definition video signal is reduced on the premise that the quality of the ultra-high-definition video signal is not affected through performing a CSC process and/or DSC process on the ultra-high-definition video signal at the transmitting side chip, thereby reducing a bandwidth required in conversion, switch and transmission of the ultra-high-definition video signal. A matrix switch chip with a low cost and general performance is used. Then, a corresponding DSC data decompression process and/or CSC process are performed at the receiving side to recover the performance of the ultra-high-definition video signal. With the above matrix switcher provided according to the present disclosure, a function of switching or distributing an ultra-high-definition signal with a low-cost switcher or distributor may be achieved on a premise of ensuring the quality of the ultra-high-definition signal.

BRIEF DESCRIPTION OF THE DRAWINGS

In order to more clearly illustrate technical solutions of the embodiments of the present disclosure or the conventional technology, the drawings required in the description of the embodiments or the conventional technology are briefly described below. Apparently, the drawings show only some embodiments of the present disclosure, and other drawings may be acquired by those skilled in the art based on the drawings provided herein without any creative work.

DETAILED DESCRIPTION OF EMBODIMENTS

The technical solutions according to the embodiments of the present disclosure will be described clearly and completely hereinafter in conjunction with the drawings in the embodiments of the present disclosure. Apparently, the described embodiments are only a part rather than all of embodiments of the present disclosure. Any other embodiments acquired by those skilled in the art based on the embodiments of the present disclosure without any creative work fall in the protection scope of the present disclosure.

A matrix switcher forming a matrix structure of M×N may transmit one or more channels of ultra-high-definition video signals to one or more display devices. That is, there are multiple channels of output selections in a case of multiple channels of inputs, where each channel of output may be connected with different input signals, each channel of output can only be connected to one channel of input, and one channel of input may be connected to different channels of outputs simultaneously. The principle is to turn on or off the output or the input by using an internal circuit of the chip and to control and complete the signal selection through levels.

Figure 1:
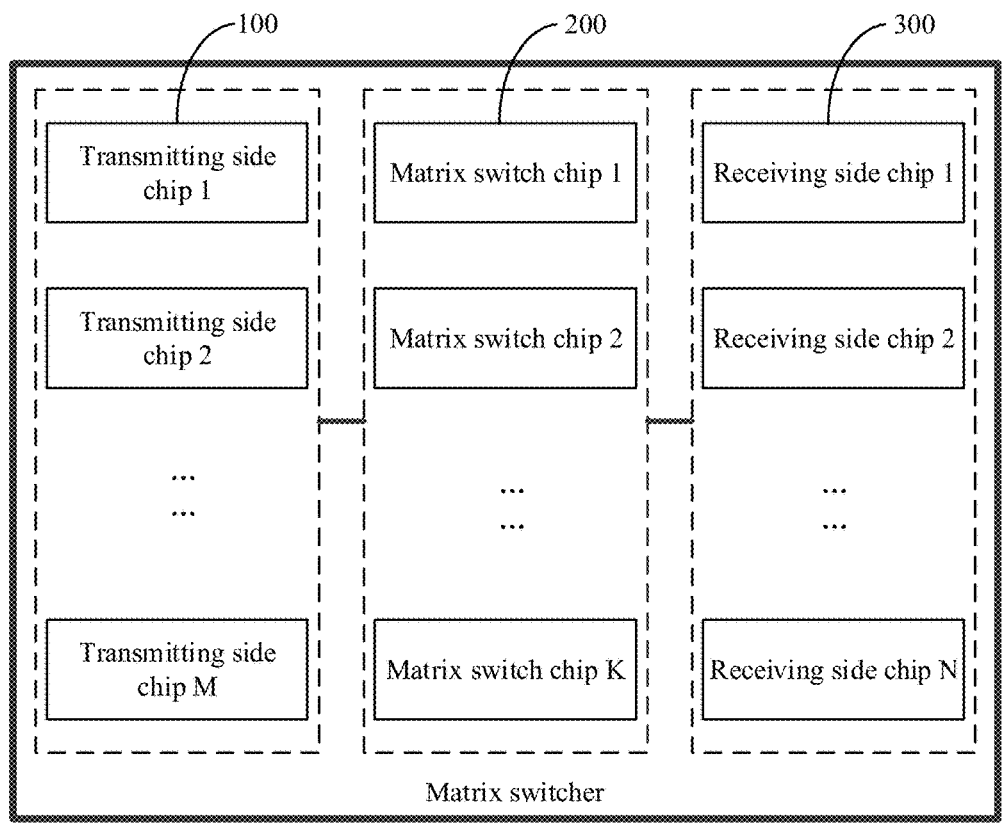
FIG. 1 is a schematic structural diagram of a matrix switcher according to an embodiment of the present disclosure.

Reference is made to FIG. 1, which is a schematic structural diagram of a matrix switcher according to an embodiment of the present disclosure. The matrix switcher includes M transmitting side chips 100, K matrix switch chips 200 and N receiving side chips 300. The M transmitting side chips are connected to the N receiving side chips via the K matrix switch chips. The K matrix switch chips are configured to forward at least one group of input signals transmitted from the M transmitting side chips to the N receiving side chips. Each of M, K and N is an integer greater than or equal to 1, and generally, the value of each of M and N is greater than the value of K. That is, the matrix switcher provided in the embodiment of the present disclosure may be a matrix of 4×4 or 8×8, or a matrix of 4×2, 10×16, etc, which is not limited herein. The transmitting side chip is an Application Specific Integrated Circuit (ASIC) chip or a Field Programmable Gate Array (FPGA) chip. The receiving side chip is an ASIC chip or a FPGA chip. The matrix switch chip is generally a signal free diverter switch having multiple channels of inputs and multiple channels of outputs. A more channels of the signal results in a larger parasitic load and more serious signal attenuation. It should be noted that all the chips with a matrix switch function may be used as the matrix switch chip of the present disclosure, such as a LT8644 type matrix switch chip.

Figure 2:
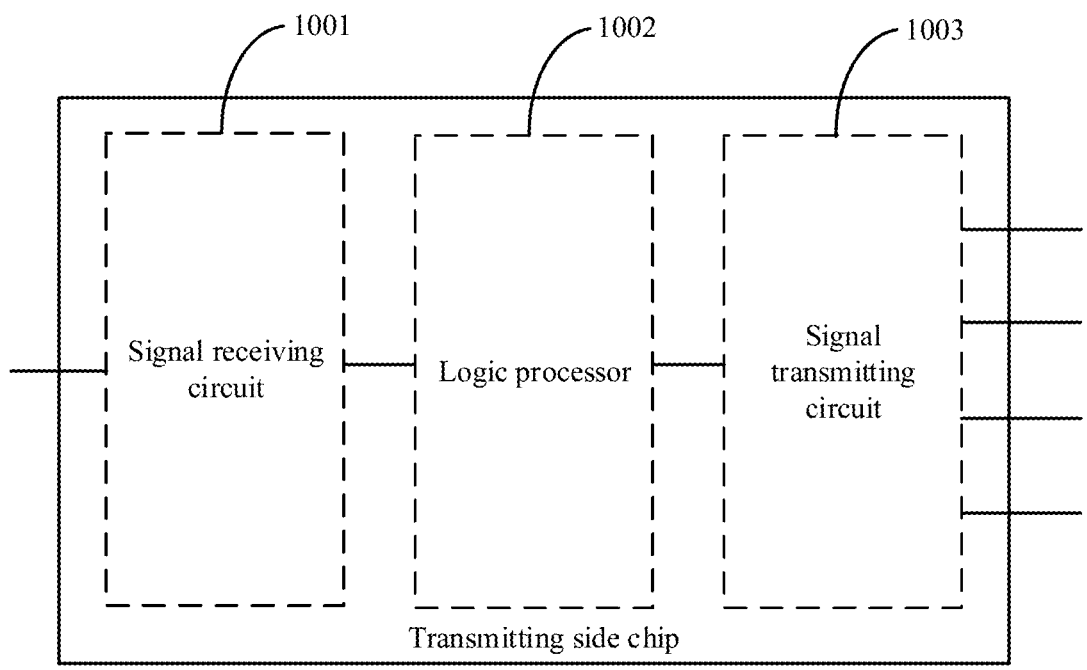
FIG. 2 is a schematic structural diagram of an transmitting side chip of a matrix switcher according to an embodiment of the present disclosure.

Reference is made to FIG. 2, which is a schematic structural diagram of a transmitting side chip of a matrix switcher according to an embodiment of the present disclosure. The transmitting side chip includes a signal receiving circuit 1001, a logic processor 1002 and a signal transmitting circuit 1003.

The signal receiving circuit 1001 is configured to receive an ultra-high-definition video signal and unpack the ultra-high-definition video signal. It should be noted that, in the embodiment, the ultra-high-definition video signal includes an ultra-high-definition video signal adopting a High Definition Multimedia Interface (HDMI) protocol or a Display Port (DP) protocol.

The logic processor 1002 is configured to perform a Color Space Conversion (CSC) process and/or a Digital Stream Compression (DSC) process on the unpacked ultra-high-definition video signal to generate a compressed video signal.

The signal transmitting circuit 1003 is configured to transmit the compressed video signal to the K matrix switch chips through four universal high-speed differential serial ports SERializer/DESerializer (SERDESs).

It should be noted that, in a case where the ultra-high-definition video signal is the ultra-high-definition video signal adopting the DP protocol, the four SERDESs of the signal transmitting circuit of the transmitting side chip are configured to transmit four channels of data signals; and in a case where the ultra-high-definition video signal is the ultra-high-definition video signal adopting the HDMI protocol, the four SERDESs of the signal transmitting circuit of the transmitting side chip are configured to transmit three channels of data signals and one channel of a clock signal.

It should be further noted that the signal transmitting circuit of the transmitting side chip further includes a bidirectional auxiliary control channel configured to transmit a control signal and auxiliary information. The control signal mainly indicates control information for achieving a communication between the transmitting side chip and the receiving side chip. The control signal includes a signal amplitude, whether a training is completed, whether the training is required to be restarted and the like. Other auxiliary information includes information such as an audio/video format supported by an external device such as a display, whether information encryption and secret handshake is supported.

Figure 3:
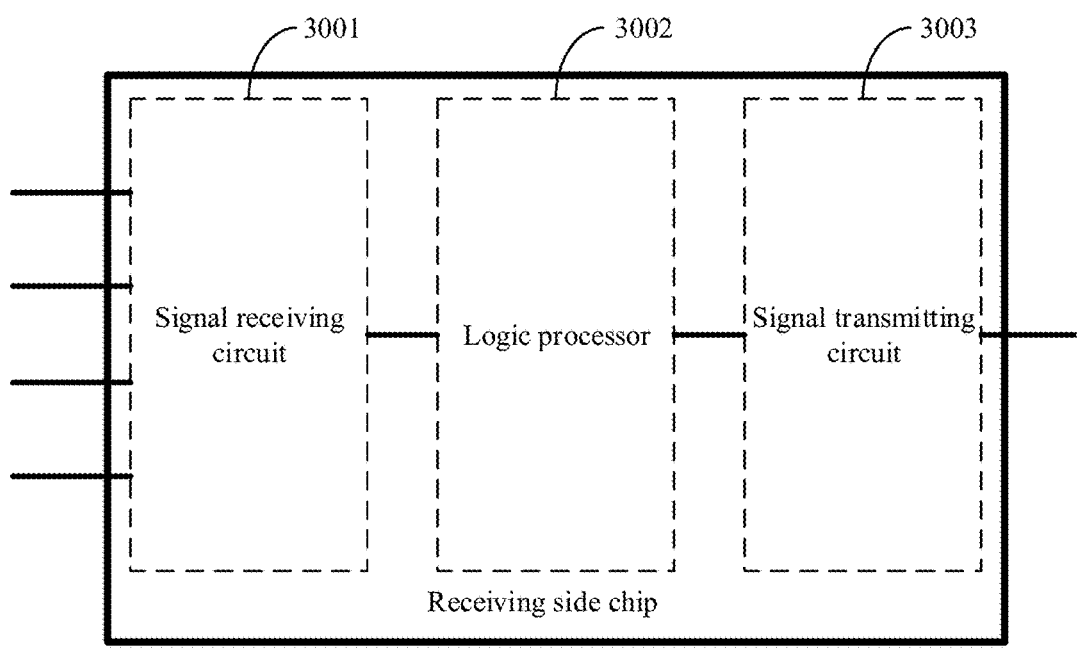
FIG. 3 is a schematic structural diagram of a receiving side chip of a matrix switcher according to an embodiment of the present disclosure.

Reference is made to FIG. 3, which is a schematic structural diagram of a receiving side chip of a matrix switcher according to an embodiment of the present disclosure. The receiving side chip includes a signal receiving circuit 3001, a logic processor 3002 and a signal transmitting circuit 3003.

The signal receiving circuit 3001 is configured to receive the compressed video signal outputted from the K matrix switch chips through the four SERDESs.

It should be noted that, in a case where the four SERDESs of the signal transmitting circuit of the transmitting side chip are configured to transmit four channels of data signals, the four SERDESs of the signal receiving circuit of the receiving side chip are configured to receive four channels of data signals; and in a case where the four SERDESs of the signal transmitting circuit of the transmitting side chip are configured to transmit three channels of data signals and one channel of a clock signal, the four SERDESs of the signal receiving circuit of the receiving side chip are configured to receive three channels of data signals and one channel of a clock signal.

The logic processor 3002 is configured to perform a DSC data decompression process and/or a CSC process on the compressed video signal to generate a decompressed video signal.

The signal transmitting circuit 3003 is configured to recover the decompressed video signal to generate an ultra-high-definition video signal and transmit the recovered ultra-high-definition video signal to an external device.

Figure 4:
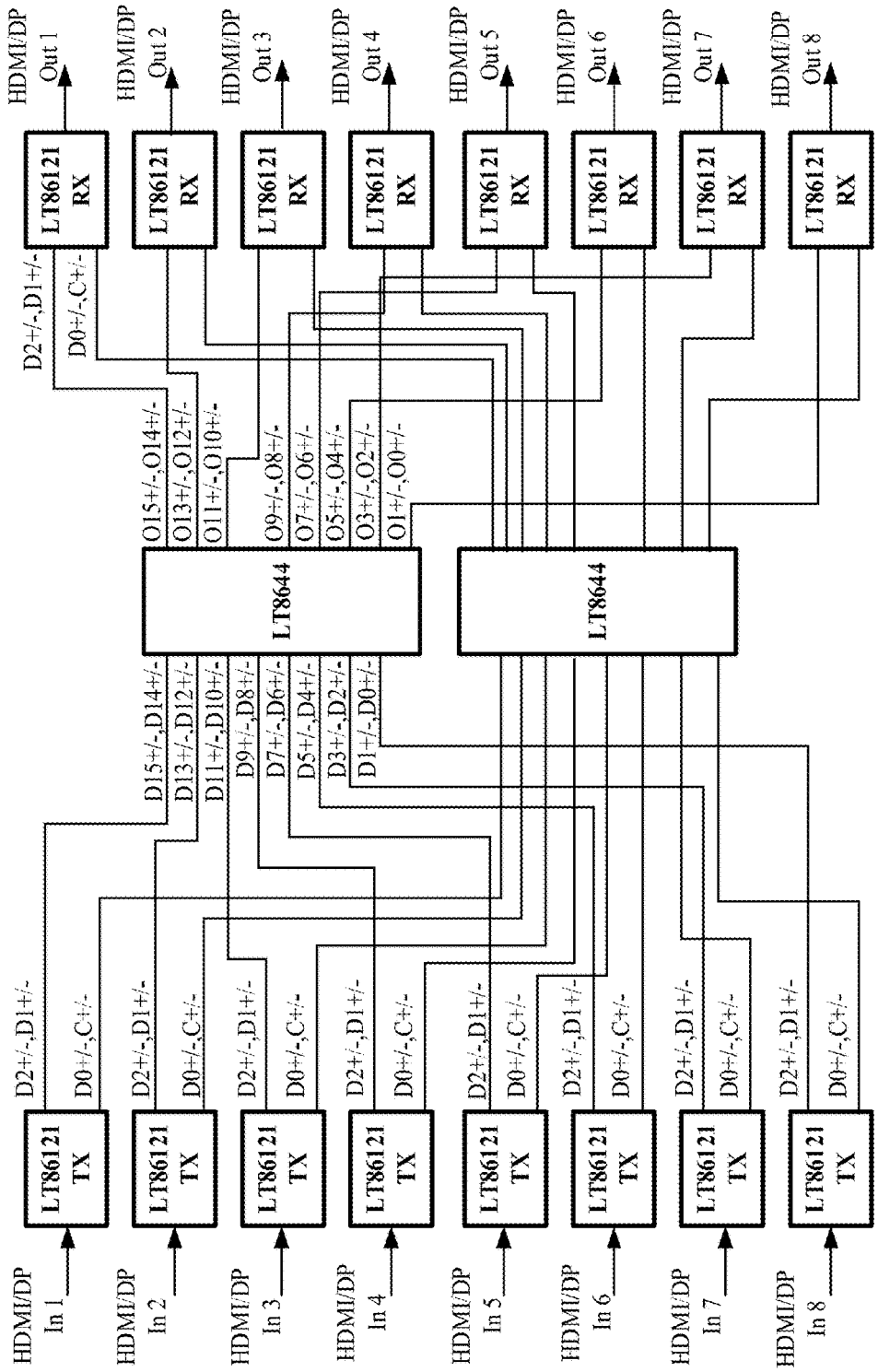
FIG. 4 is a schematic structural diagram of a specific example of a matrix switcher according to an embodiment of the present disclosure.

Reference is made to FIG. 4, which is a schematic structural diagram of a specific example of a matrix switcher according to an embodiment of the present disclosure. The matrix switcher provided in the example includes eight transmitting side chips (LT86121TX shown in FIG. 4), two matrix switch chips (LT8644 shown in FIG. 4) and eight receiving side chips (LT86121RX shown in FIG. 4). The eight transmitting side chips are connected to the eight receiving side chips via the two matrix switch chips. The two matrix switch chips are configured to forward at least one group of input signals transmitted from the eight transmitting side chips to the eight receiving side chips. The matrix switcher provided in this example may support 8×8 matrix switch of the ultra-high-definition video signal. That is, eight channels of ultra-high-definition video signals are maximally supported to be inputted and outputted. In this example, the two matrix switch chips are LT8644 type matrix switch chips, where the matrix switch chip of this type is a simple 16-channel cross-point switcher.

In this example, an ultra-high-definition video signal with a high bandwidth may be compressed by 2 to 8 times by using CSC and DSC. Specifically, it is selected whether a conversion of 4:4:4-4:2:2, or 4:4:4-4:2:0 in the CSC is adopted based on a resolution requirement of the external device, a channel number of the matrix switcher, the video format supported by the ultra-high-definition video signal received by the transmitting side chip, thereby reducing a data bandwidth. On this basis, a compression ratio (1, 2, 3, 4) of the DSC may be further selected to further reduce the bandwidth of the ultra-high-definition video signal code stream while ensuring high image quality. Once a CSC conversion mechanism of the transmitting side chip and the compression ratio of the DSC are determined, the same configuration as the transmitting side chip must be set at the receiving side chip so that the code stream of the ultra-high-definition video signal may be properly recovered and played. For a matrix with a lower order or higher order, the process is similar to the above case.

It should be noted that, in the example shown in FIG. 4, the matrix switch of eight channels of ultra-high-definition video signals may be achieved. For a matrix having channels lower than 8 channels or more than 8 channels, a connection mode between the transmitting side chip, the matrix switch chip and the receiving side chip may be achieved based on a type of the matrix switch chip by referring to a connection mode shown in FIG. 4. Specific connections among the chips are not repeated in the embodiments of the present disclosure.

In summary, a matrix switcher is provided according to the embodiment of the present disclosure. A code rate of an ultra-high-definition video signal is reduced on the premise that the quality of the ultra-high-definition video signal is not affected through performing a CSC process and/or DSC process on the ultra-high-definition video signal at the transmitting side chip, thereby reducing a bandwidth required in conversion, switch and transmission of the ultra-high-definition video signal. A matrix switch chip with a low cost and general performance is used. Then, a corresponding DSC data decompression process and/or CSC process are performed at the receiving side to recover the performance of the ultra-high-definition video signal. With the above matrix switcher provided according to the present disclosure, a function of switching or distributing an ultra-high-definition signal with a low-cost switcher or distributor may be achieved on a premise of ensuring the quality of the ultra-high-definition signal.

It should be noted that the embodiments in the specification are described in a progressive manner, with the emphasis of each of the embodiments on the difference from other embodiments. For the same or similar parts between the embodiments, reference may be made one to another. Since the device disclosed in the embodiments corresponds to the method disclosed in the embodiment, the description for the device is simple, and reference may be made to the method embodiment for the relevant parts.

Those skilled in the art can further realize that the units and the algorithm steps of the examples described in conjunction with the embodiments disclosed herein, may be implemented by electronic hardware, computer software, or a combination thereof. To illustrate interchangeability between the hardware and the software clearly, the composition and the steps of each of the examples are generally described according to functions in the above illustration. Whether the functions being performed by hardware or software depends on a specific application and a design constraint condition of the technical solution. Those skilled in the art can implement the described functions using different methods for each of the specific applications, however, the implementation should not be considered to go beyond the scope of the present disclosure.

Steps of the method or the algorithm described in conjunction with the embodiments disclosed herein may be implemented directly with hardware, a software module executed by a processor or a combination thereof. The software module may be provided in a Random Access Memory (RAM), a memory, a Read Only Memory (ROM), an electrically programmable ROM, an electrically erasable programmable ROM, a register, a hard disk, a removable disk, a CD-ROM, or a storage medium in any other forms known in the art.

The above description of the embodiments herein enables those skilled in the art to implement or use the present disclosure. Numerous modifications to the embodiments are apparent to those skilled in the art, and the general principles defined herein can be implemented in other embodiments without deviating from the spirit or scope of the present disclosure. Therefore, the present disclosure is not limited to the embodiments described herein but is to conform to the widest scope consistent with the principles and novel features disclosed herein.

The invention claimed is:

1. A matrix switcher, comprising: M transmitting side chips, K matrix switch chips and N receiving side chips, wherein
the M transmitting side chips are connected to the N receiving side chips via the K matrix switch chips, the K matrix switch chips are configured to forward at least one group of input signals transmitted from the M transmitting side chips to the N receiving side chips, each of M, K and N is an integer greater than or equal to 1, and the value of each of M and N is greater than the value of K;
each of the transmitting side chips comprises:
a signal receiving circuit, configured to receive an ultra-high-definition video signal and unpack the ultra-high-definition video signal;
a logic processor, configured to perform at least one of a Color Space Conversion (CSC) process and a Digital Stream Compression (DSC) process on the unpacked ultra-high-definition video signal to generate a compressed video signal; and
a signal transmitting circuit, configured to transmit the compressed video signal to the K matrix switch chips through four universal high-speed differential serial ports SERializer/DESerializer (SERDESs), and
each of the receiving side chips comprises:
a signal receiving circuit, configured to receive the compressed video signal outputted from the K matrix switch chips through the four SERDESs;
a logic processor, configured to perform at least one of a DSC data decompression process and a CSC process on the compressed video signal to generate a decompressed video signal; and
a signal transmitting circuit, configured to recover the decompressed video signal to generate an ultra-high-definition video signal and transmit the recovered ultra-high-definition video signal to an external device;
wherein the four SERDESs of the signal transmitting circuit of the transmitting side chip are configured to transmit four channels of data signals, in a case that the ultra-high-definition video signal is a ultra-high-definition video signal adopting a Display Port (DP) protocol; and
wherein the four SERDESs of the signal transmitting circuit of the transmitting side chip are configured to transmit three channels of data signals and one channel of a clock signal, in a case that the ultra-high-definition video signal is a ultra-high-definition video signal adopting a High Definition Multimedia Interface (HDMI) protocol.

2. The matrix switcher according to claim 1, wherein the signal transmitting circuit of the transmitting side chip further comprises a bidirectional auxiliary control channel configured to transmit a control signal and auxiliary information.

3. The matrix switcher according to claim 1, wherein the transmitting side chip is an Application Specific Integrated Circuit (ASIC) chip or a Field Programmable Gate Array (FPGA) chip.

4. The matrix switcher according to claim 1, wherein the matrix switch chip is a LT8644 type matrix switch chip.

5. The matrix switcher according to claim 1, wherein
in a case where the four SERDESs of the signal transmitting circuit of the transmitting side chip are configured to transmit four channels of data signals, the four SERDESs of the signal receiving circuit of the receiving side chip are configured to receive four channels of data signals; and
in a case where the four SERDESs of the signal transmitting circuit of the transmitting side chip are configured to transmit three channels of data signals and one channel of a clock signal, the four SERDESs of the signal receiving circuit of the receiving side chip are configured to receive three channels of data signals and one channel of a clock signal.

6. The matrix switcher according to claim 1, wherein the receiving side chip is an Application Specific Integrated Circuit (ASIC) chip or a Field Programmable Gate Array (FPGA) chip.

7. The matrix switcher according to claim 1, wherein the value of M is 8, the value of K is 2, and the value of N is 8.

* * * * *